United States Patent
Pugin et al.

[15] 3,682,966
[45] Aug. 8, 1972

[54] SALICYLOYLAMINO-ANTHRAQUINONE PIGMENTS

[72] Inventors: Andre Pugin, Grenzacherweg 301, Riehen; Kurt Burdeska, Paracelsusstrasse 64; Ernst Model, Blotzheimerstrasse 69, both of Basle, all of Switzerland

[22] Filed: Sept. 2, 1969

[21] Appl. No.: 854,770

[30] Foreign Application Priority Data

Sept. 13, 1968 Switzerland............13770/68

[52] U.S. Cl.............260/326 D, 260/41 C, 260/281, 260/295 T, 260/347.5, 260/37 D, 106/23, 106/288 Q
[51] Int. Cl...........................................C07d 27/52
[58] Field of Search.................................260/326 D

[56] References Cited

UNITED STATES PATENTS 2,533,178   12/1950   Randall et al.............260/326

*Primary Examiner*—Alex Mazel
*Assistant Examiner*—Joseph A. Narcavage
*Attorney*—Wenderoth, Lind & Ponack

[57] ABSTRACT

Salicyloylamino-anthraquinones are described in which the benzene nucleus of the salicyloyl radical is substituted by an amido group.

Preferred pigments of this class are of yellow color with a greenish hue, and are distinguished by particularly good weather- and light-fastness and fastness to solvents.

8 Claims, No Drawings

SALICYLOYLAMINO-ANTHRAQUINONE PIGMENTS

DESCRIPTION OF THE INVENTION

The present invention concerns new anthraquinone pigments; processes for the production thereof and their application for the pigmenting of high molecular organic material.

It is well known that 1-salicylic acid amidoanthraquinones are suitable as pigments. Pigments of this series are thus known wherein the salicylic acid radical is substituted by chlorine. These pigments usually have a very good fastness to light but the other fastness properties, especially fastness to migration and cross-lacquering, are not good, so that their use in lacquers and plastics is extremely limited.

It was therefore not foreseeable that the anthraquinone pigments, according to the invention, would have the desired properties, at the same time preserving their good fastness to light. The compounds concerned are of the formula I,

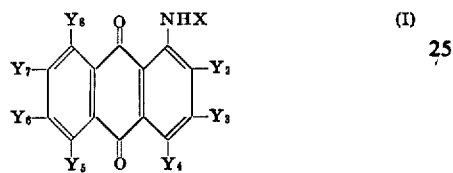

wherein
from $Y_2$ to $Y_8$ at most four Y-substituents represent chlorine, at most two Y-substituents represent the methyl or the methoxy radical or bromine and of $Y_4$, $Y_5$ and $Y_8$ at most one substituent represents $H_2N-$ or aroylNH and the remaining $Y_2 - Y_8$ represent hydrogen, and whereby
X represents the radical of the formula II,

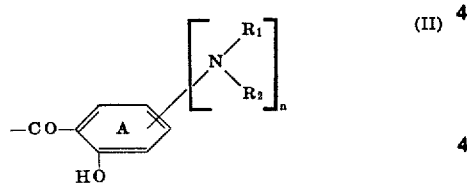

wherein
n represents 1 or 2
$R_1$ represents hydrogen and
$R_2$ represents the acyl radical of the formula III,

wherein $R_3$ represents an alkyl radical having one to four carbon atoms, a mono- or binuclear aryl radical, an heterocylic or hydroaromatic radical, or the radical $-OR_4$ or $-NHR_4$, wherein $R_4$ denotes an aromatic or an aliphatic radical having one to four carbon atoms, or $R_1$ and $R_2$ represent, together with the nitrogen atom, an optionally condensed, 5- or 6-membered, cylic dicarbimide radical, and the phenyl radical A can be substituted by halogen, trifluoromethyl, methoxy or alkyl having one to four carbon atoms.

In the compounds of the formula I, one or several of the symbols $Y_2$ to $Y_8$ can for example represent chlorine or bromine, whereby in particular the 4-chloro, 5-chloro, 6, 7-dichloro, 5,6,7,8-tetrachloro and the 2,4-dibromo-substituted anthraquinone compounds are preferred.

The Y-substituents can also represent the methyl or methoxy radical, whereby the 2-methyl, 4-methoxy, 4-methoxy-5-chloro or the 2-methyl-4-chloroanthraquinone compounds are particularly important. One of the substituents $Y_4$, $Y_5$ and $Y_8$ can also denote the $-NH_2-$ group, whereby the $-NH_2-$group, in its turn, can be substituted by the acyl radical of an optionally substituted benzoic acid, amongst others also by the radical X. Thus in formula I, the anthraquinone radical can contain for example in four-position, the benzoylamino group.

In formula II, the phenyl nucleus A can be substituted, e.g., by chlorine, bromine, the methyl or methoxy group.

The acid amide group or the ring-closed acid imide group

can be present singly or twofold.

In the acyl radical of the formula III of the acid amide group, $R_3$ represents a lower alkyl radical having one to four carbon atoms, a mono- or binuclear aryl radical, e.g., the phenyl radical, a phenyl radical substituted by halogen, alkyl, alkoxy or acylamino groups, the diphenyl or the naphthyl radical; furthermore, $R_3$ can represent an heterocyclic radical such as, e.g., acid derivatives of pyridine, or a hydroaromatic radical. In the acyl radical of the formula III, $R_3$ can also represent, e.g., the radical $-OR_4$ or $-NHR_4$. The acyl group can also be, therefore, an aromatic or an aliphatic urethane or urea group having preferably one to four carbon atoms.

Suitable acylated aminosalicylic acid radicals of the formula II, according to the invention, are for example the following:

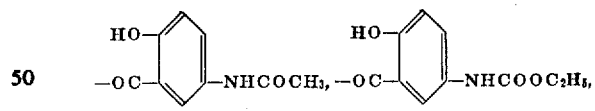

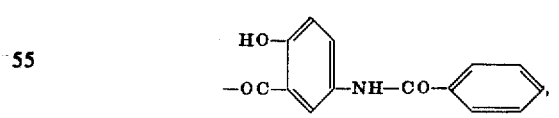

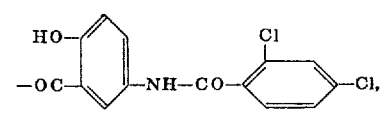

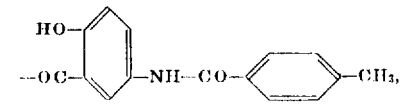

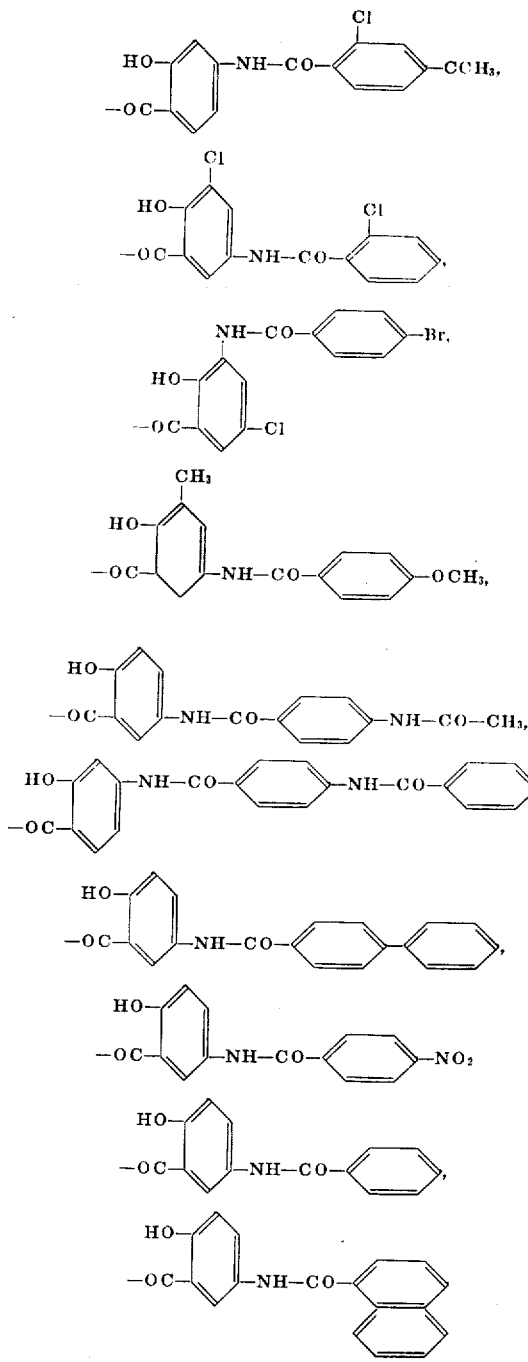

In formula II of the salicylic acid ester, the acid amide group can also be ring-closed, i.e., $R_1$ and $R_2$ can together form an optionally five- or six-membered cyclic carbimide radical, whereby the cyclic carbimide radical can be, e.g., an optionally substituted phthalimido group or a pyridine-di-carboxylic acid imide group.

The anthraquinone pigments, according to the invention, have an outstanding fastness to migration, solvents and cross-lacquering, in addition to an excellent fastness to weather and light. In general, they possess a good texture and can often be used in the form of their crude product. If necessary or desirable, the crude products can be converted, by grinding or kneading, into a finely dispersed form. Grinding auxiliary agents are thereby advantageously used, such as inorganic and/or organic salts in the presence or absence of organic solvents. An improvement in the properties can also frequently be achieved by heating the crude pigments in hot organic solvents. After grinding, the auxiliary agents are removed in the usual manner, soluble inorganic salts being removed, for example, with water and water-insoluble organic auxiliaries, e.g., by steam distillation. Reprecipitation from sulphuric acid also frequently suffices to obtain a deeply-colored, finely dispersed, transparent pigment fiber.

Particularly preferred compounds falling under formula I are those in which X represents

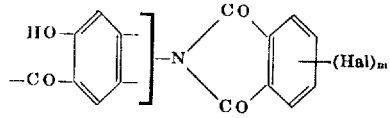

Hal represents chlorine or bromine, m represents from 0 to 4, a first of $Y_4$, $Y_5$ and $Y_8$ represents the same as X—NH—, benzoylamino, chloro-benzoylamino, or hydrogen, and the second and the third thereof represent hydrogen; each of $Y_2$, $Y_3$, $Y_6$, and $Y_7$ is hydrogen or chlorine.

Most preferred are those pigments falling under formula I, wherein X represents

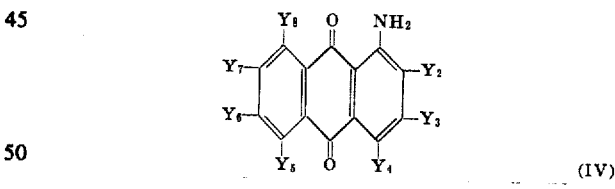

Hal represents chlorine or bromine, m represents from 0 to 4, $Y_2$, $Y_3$, and $Y_6$ represent hydrogen, one of $Y_4$ and $Y_5$ represent benzoylamino or chloro-benzoylamino and the other hydrogen, and each of $Y_6$ and $Y_7$ represent hydrogen or chlorine.

These pigments are distinguished by particularly high weather fastness and surprisingly good fastness to solvents.

The pigments of the formula I, according to the invention, can be produced from 1-aminoanthraquinone of the formula IV $$\begin{array}{c}\text{(IV)}\end{array}$$

wherein $Y_2$ to $Y_8$ have the meaning given in formula I, by reaction with a compound yielding the salicylic acid radical of the formula II. Suitable as a compound yielding the salicylic acid radical are the salicylic acids or salicylic acid halides corresponding to the salicylic acid radicals of the formula II. The amide formation can also proceed by way of the radical of the formula II with the 1-aminoanthraquinone, corresponding to a reamidation reaction.

Moreover, the acylation can be performed with an aliphatic, aromatic, hydroaromatic or heterocyclic (ortho) dicarboxylic acid, a dicarboxylic acid anhydride or -halide to the carbimide compound.

Suitable for the amide formation, according to the invention, are for example the following
- 1-aminoanthraquinones
- 1-aminoanthraquinone
- 1-amino-4-chloroanthraquinone
- 1-amino-5-chloroanthraquinone
- 1-amino-6,7-dichloroanthraquinone
- 1-amino-5,6,7,8-tetrachloroanthraquinone
- 1-amino-2-methylanthraquinone
- 1-amino-6,7-dimethylanthraquinone
- 1-amino-2,4-dibromoanthraquinone
- 1-amino-4,5-dimethoxyanthraquinone
- 1-amino-5,8-dimethoxyanthraquinone
- 1-amino-4-methoxyanthraquinone
- 1-amino-4-methoxy-5-chloroanthraquinone
- 1-amino-2-methyl-4-chloroanthraquinone
- 1-amino-4-benzoylaminoanthraquinone In the above given 1-aminoanthraquinones, a second amino substituent can optionally be present. This second amino radical can be in four-, five- or eight-position and can be reacted, for example, with a further salicylic acid radical of the formula II, or with an unsubstituted or substituted benzoic acid. According to the invention, the acylation of the 1-aminoanthraquinone in the 1-amino position is always effected by a salicylic acid derivative yielding the salicylic acid radical of the formula II.

The production of the pigments of the formula I, according to the invention, can for example also be achieved by performing the acylation of the aminoanthraquinones with salicylic acids or -chlorides containing nitro groups, and then further acylating the obtained compounds, following the reduction of the nitro group(s) to the amino group(s) after the first acylation, in accordance with the explanations given above for the pigments of formula I.

The new pigments of the anthraquinone series are suitable for the pigmenting of polymeric organic material, e.g., in printing inks for the printing industry, in paints having an oily base such as linseed-oil paints, or with an aqueous base such as dispersion paints, or in lacquers of varying kinds such as in nitrolacquers or stoving lacquers, having in the latter case, e.g., an alkyd resin or acryl resin base. They can also be used for the spinning-dyeing of viscose or cellulose acetate, for the pigmenting of plastics such as polyethylene, polystyrene, polyvinyl chloride, whereby the latter can also contain softeners, also for the pigmenting of cellulose esters, curable resins or for the pigmenting of rubber. They are also applicable for the dyeing of paper pulp or for the coating of webs, e.g., in the production of laminated paper.

The following examples illustrate the invention without limiting it in any way. All temperatures are given in degrees Centigrade.

EXAMPLE 1

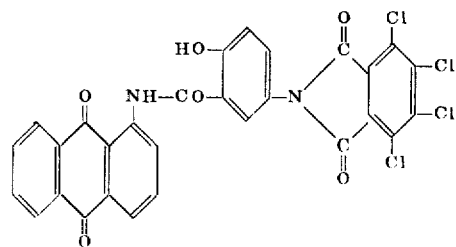

22.3 g of 1-aminoanthraquinone and 46.3 g of 2-hydroxy-5-tetrachlorophthalimido-1-benzoic acid are heated with 500 ml of -benzoic to 105°–110°. Into the yellow suspension are then added, while stirring well and within 1 ½ hours, 13.56 g of thionyl chloride, dissolved in 50 ml of nitrobenzene. When the formation of hydrochloric acid has subsided after about 30 minutes, the suspension is heated for 2 hours to 140°–145° and, to complete the reaction, for a further 20 minutes to 160°–165°. After cooling to 110°, the precipitated yellow product is filtered off, washed with nitrobenzene and then with alcohol, and dried at 110° in vacuo. By this means are obtained 61.5 g of a greenish-yellow pigment of the above stated formula, which has a very good fastness to cross-lacquering, migration, light and weather.

If the 2-hydroxy-5-tetrachlorophthalimido-1-benzoic acid is replaced by equimolecular amounts of 2-hydroxy-5-(4'-chloro- or 4'-nitrophthalimido)-1- acid, 2-hydroxy-5-phthalimido-1-benzoic acid, 2-hydroxy-4-tetrachlorophthalimido-1-benzoic acid, or 2-hydroxy-4-phthalimido-1-benzoic acid, with the procedure being otherwise the same, then pigments are obtained having similar fastness properties to those stated above.

Furthermore, if the 22.3 g of 1-aminoanthraquinone are replaced by equimolecular amounts of one of the aminoanthraquinones listed in the following table I, using otherwise the same procedure, then pigments are obtained having similar fastness properties and with the shades given in column 3 of the table.

TABLE I

| Ex. | Aminoanthraquinone | Shade in paper printing |
|---|---|---|
| 2 | 1-amino-4-chloroanthraquinone | yellow |
| 3 | 1-amino-5-chloroanthraquinone | yellow |
| 4 | 1-amino-6,7-dichloroanthraquinone | reddish-yellow |
| 5 | 1-amino-5,6,7,8-tetrachloroanthraquinone | reddish-yellow |
| 6 | 1-amino-2-methylanthraquinone | reddish-yellow |
| 7 | 1-amino-2,4-dibromoanthraquinone | yellow |
| 8 | 1-amino-4-methoxyanthraquinone | orange |
| 9 | 1-amino-4-methoxy-5-chloroanthraquinone | orange |
| 10 | 1-amino-2-methyl-4-chloroanthraquinone | reddish-yellow |
| 11 | 1-amino-4-(4'-chlorobenzoyl)-aminoanthraquinone | orange |
| 11a | 1-amino-5-(4'-chlorobenzoyl)-aminoanthraquinone | yellow |
| 11b | 1,4-diamino-2,3-dichloroanthraquinone | orange |

EXAMPLE 12

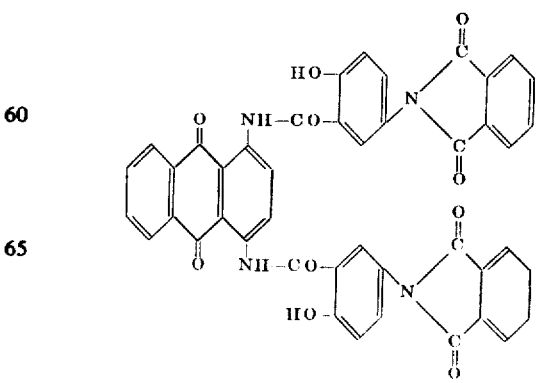

4.76 g of 1,4-diaminoanthraquinone and 11.9 g of 2-hydroxy-5-phthalimido-1-benzoic acid are suspended in 250 ml of nitrobenzene and heated to 105°–110°. To this suspension are then added dropwise within 2 hours, 5.22 g of thionyl chloride, dissolved in 35 ml of nitrobenzene. While stirring well, it is then heated for 3 hours to 150°–155° and then for a further 15 minutes to 180°–185°. After cooling to 80°, the orange-red colored product is filtered off, washed with nitrobenzene, alcohol and acetone and dried. By this means are obtained 13.4 g of a reddish-yellow pigment of the above given formula having an excellent fastness to cross-lacquering, migration and light.

Pigments exhibiting similarly good fastness properties are obtained if, using otherwise the same procedure, the 11.9 g of 2-hydroxy-5-phthalimido-1-benzoic acid is replaced by the equimolecular amount of 2-hydroxy-4-phthalimido-1-benzoic acid, 2-hydroxy-5-hexahydrophthalimido-1-benzoic acid, 2-hydroxy-5-(3'-pyridinoylamido)-1-benzoic acid, 2-hydroxy-5-(2'-furanoylamido)-1-benzoic acid or 2-hydroxy-5-(1',8'-naphthalimido)-1-benzoic acid.

EXAMPLE 13

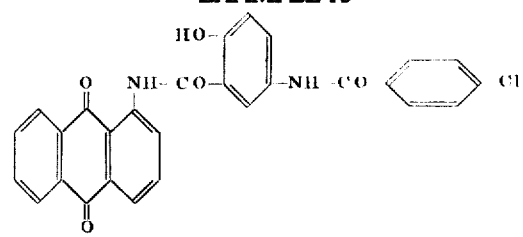

8.92 g of 1-aminoanthraquinone and 12.82 g of 2-hydroxy-5-(4'-chlorobenzoylamino)-1-benzoic acid are heated with 200 ml of nitrobenzene to 90°–95°. At this temperature is slowly added dropwise, a solution of 5.23 g of thionyl chloride in 20 ml of nitrobenzene. After this addition has been made, the greenish-yellow suspension is heated within 30 minutes to 130°–135° and then stirred for a further 3 hours at this temperature. After cooling to 90°, the product is filtered off, washed with nitrobenzene, alcohol and acetone and dried in vacuo at 80°–90°. The yield is 14.6 g. The greenish-yellow pigment of the above given formula has a very good fastness to cross-lacquering and to light.

| Example No. | Hydroxybenzoic acid | Shade in paper printing |
|---|---|---|
| 14 | HO—⟨⟩—NH—CO—⟨⟩(Cl)—Cl ; HOOC— | Greenish yellow. |
| 15 | HO—⟨⟩—NH—CO—⟨⟩—CH₃ ; HOOC— | Do. |
| 16 | HO—⟨⟩—NH—CO—⟨⟩—OCH₃ ; HOOC— | Yellow. |
| 17 | HO—⟨⟩(Cl)—NH—CO—NH—C₂H₅ ; HOOC— | Greenish yellow. |
| 18 | HO—⟨⟩(NH—CO—⟨⟩—Br)— ; HOOC—⟨⟩—Cl | Do. |
| 19 | HO—⟨⟩(CH₃)—NH—CO—⟨⟩—OCH₃ ; HOOC— | Reddish yellow. |
| 20 | HO—⟨⟩—NH—CO—⟨⟩—NH—CO—CH₃ ; HOOC— | Do. |
| 21 | HO—⟨⟩—NH—CO—⟨⟩—NH—CO—⟨⟩—Cl ; HOOC— | Do. |
| 22 | HO—⟨⟩—NH—CO—⟨⟩—⟨⟩ ; HOOC— | Greenish yellow. |

Table – Continued

| Example No. | Hydroxybenzoic acid | Shade in paper printing |
|---|---|---|
| 23 | 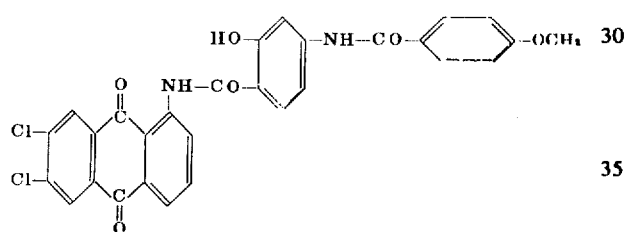 | Do. |
| 24 | | Yellow. |
| 25 | | Do. |

Pigments having similarly good fastness properties are obtained if the 2-hydroxy-5-(4'-chlorobenzoylamino)-1-benzoic acid, given in the example, is replaced by equimolecular amounts of a substituted 2-hydroxy-1-benzoic acid listed in table II. The shades of color in the paper printing are given in column 3

EXAMPLE 26

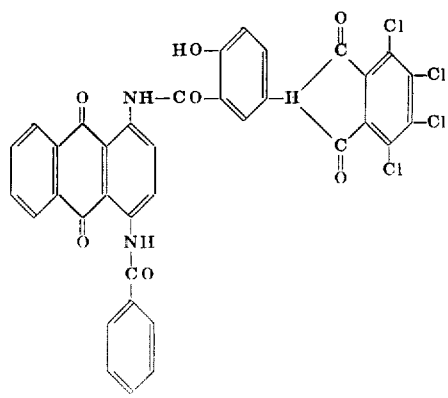

A solution of 4.1 g of thionyl chloride in 25 ml of nitrobenzene is added, while stirring well and within 1 ½ hours, to a suspension — heated to 105°–110° — of 8.8 g of 1-amino-6,7-dichloroanthraquinone and 9.9 g of 2-hydroxy-5-(4'-methoxybenzoylamino)-1-benzoic acid. The orange-red suspension is stirred for a further 30 minutes at 105°–110° and then heated for 3 hours to 130°–135°. After cooling to 80°, the reddish-yellow product is filtered off, washed with nitrobenzene, alcohol and acetone and dried.

12.9 g of a reddish-yellow pigment of the above given formula are thus obtained, which has a very good fastness to cross-lacquering and light.

EXAMPLE 27

8.55 g of 1-amino-4-benzoylaminoanthraquinone and 11.6 g of 2-hydroxy-5-tetrachlorophthalimido-1-benzoic acid are heated with 200 ml of nitrobenzene to 105°–110°. Into the orange-red suspension are then added, within 1 ½ hours, 3.41 g of thionyl chloride dissolved in 25 ml of nitrobenzene. After the evolution of hydrochloric acid has finished, the suspension is heated for 3 hours to 145°–150°. It is then cooled to 100° and the orange-red product of the above given formula is filtered off. It is washed with nitrobenzene and then with ethanol and dried.

By this means are obtained 15 g of an orange-red pigment which has a very good fastness to cross-lacquering and to light.

EXAMPLE 28

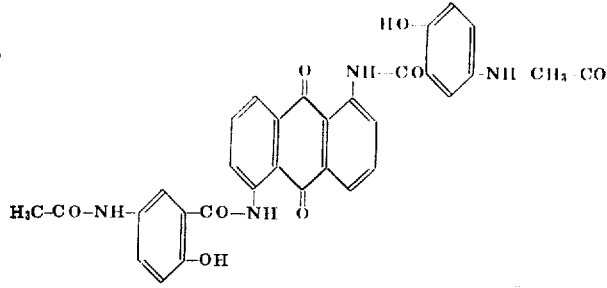

Within 2 hours, 8.92 g of thionyl chloride dissolved in 30 ml of nitrobenzene are added dropwise to a suspension — heated to 90°–95° — of 7.15 g of 1,5-diaminoanthraquinone and 14 g of 2-hydroxy-5-acetylamino-1-benzoic acid in 250 ml of nitrobenzene. The suspension is maintained for 1 hour, while stirring well, at 95°–100° and then heated for a further 3 hours to 140°–145°. After cooling to 100°, the reddish-yellow product is filtered off, washed with nitrobenzene and alcohol and dried. By this means are obtained 16 g of a reddish-yellow pigment of the above given formula, which has a very good fastness to cross-lacquering, migration and light.

If, in the above example, the 14 g of 2-hydroxy-5-acetylamino-1-benzoic acid are replaced by 18.5 g of 2-hydroxy-5-benzoylamino-1-benzoic acid, with otherwise the same procedure, then likewise is obtained a reddish-yellow pigment having similar properties.

EXAMPLE 29

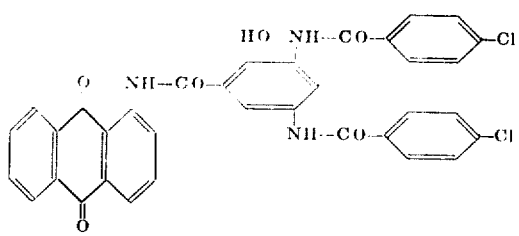

3.75 g of 2'-hydroxy-3',5'-diaminobenzoyl-1-aminoanthraquinone with 3.85 g of p-chlorobenzoyl chloride in 150 ml of freshly distilled o-dichlorobenzene are refluxed for 7 hours. A yellow precipitate is formed which is filtered off at 150°. After the residue has been washed with o-dichlorobenzene, alcohol and acetone and then dried, 3 g of a yellowish-brown pigment are obtained having a very good fastness to cross-lacquering.

The 2'-hydroxy-3',5'-diaminobenzoyl-1-aminoanthraquinone is obtained by condensation of 2-hydroxy-3,5-dinitrobenzoic acid with 1-aminoanthraquinone in nitrobenzene in the presence of thionyl chloride, and by subsequent reduction of the nitro groups by means of sodium dithionite in water-alcohol in the presence of soda.

If, in this example, the p-chlorobenzoyl chloride is replaced by equimolecular amounts of o-chloro, or o-methyl or p-methylbenzoyl chloride, with the procedure otherwise as described above, then likewise are obtained yellowish-brown pigments having good fastness to cross-lacquering.

EXAMPLE 30

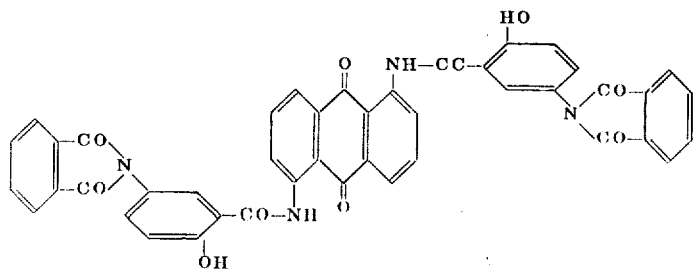

5.18 g of bis-(2'-hydroxy-5-'-aminobenzoyl)-1,5-diaminoanthraquinone are refluxed for 3 hours with 4.87 g of o-phthalic acid dichloride in 200 ml of freshly distilled o-dichlorobenzene. The formed yellow precipitate is filtered off at 150°, washed with o-dichlorobenzene, alcohol and acetone and dried. By this means are obtained 5.7 g of a yellow powder which, after grinding with salts, yields a reddish-yellow pigment having a good fastness to light, cross-lacquering and migration.

The bis-(2'-hydroxy-5'-aminobenzoyl)-1,5-diaminoanthraquinone is obtained by condensation of 2-hydroxy-5-nitrobenzoic acid with 1,5-diaminoanthraquinone in nitrobenzene in the presence of thionyl chloride and by subsequent reduction of the nitro groups by means of sodium dithionite in water-alcohol in the presence of soda.

Reddish-yellow pigments having similarly good properties are obtained if, in this example, the o-phthalic acid dichloride is replaced by equimolecular amounts of tetrachlorophthalic acid dichloride, benzoyl chloride, p-chlorobenzoyl chloride or p-methylbenzoyl chloride.

EXAMPLE 31

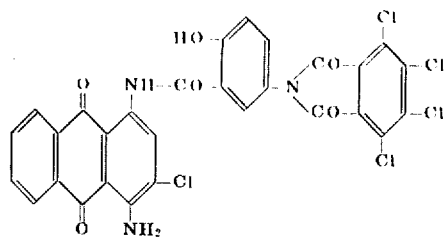

27.25 g of 1,4-diamino-2-chloroanthraquinone and 46.3 g of 2-hydroxy-5-tetrachlorophthalimido-1-benzoic acid are heated with 500 g of nitrobenzene to 105°–110°. Into the suspension are introduced, while stirring, 13.56 g of thionyl chloride, dissolved in 50 ml of nitrobenzene. The suspension is then heated for two hours to 140°–145°. The red suspension is filtered off hot, the residue washed with nitrobenzene and alcohol and dried. This produces 63 g of a red pigment which has a very good fastness to cross-lacquering.

EXAMPLE 32

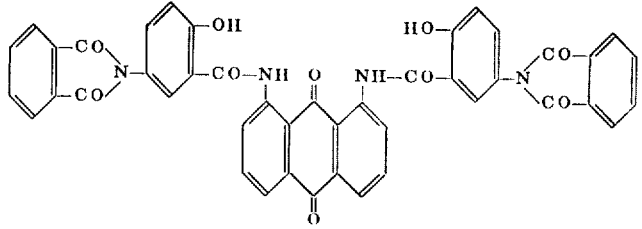

4.76 g of 1,8-diaminoanthraquinone and 11.9 g of 2-hydroxy-5-phthalimido-1-benzoic acid are suspended in 250 ml of 1,2-dichlorobenzene and heated to 105°–110°. Into this suspension are added dropwise within 1 hour, 5.22 g of thionyl chloride, dissolved in 20 ml of nitrobenzene. While stirring well, the suspension is then heated for 3 hours to 150°–156° and for a further 15 minutes to 170°–175°. After cooling to 80°, the reddish-yellow product is filtered off, washed with 1,2-dichlorobenzene, alcohol and acetone, and dried. By this means are produced 12 g of a yellow pigment of the above given formula, which has an excellent fastness to cross-lacquering, migration and light.

EXAMPLE 33

40 g of the pigment produced according to Example 27, 360 g of hydrate of alumina, 600 g of linseed oil varnish of medium viscosity and 2 g of cobalt linoleate are mixed on a three-roller mill and ground. A printing ink is obtained which produces orange-red paper printings which have an excellent fastness to light.

EXAMPLE 34

To 100 g of a stoving lacquer consisting of 58.5 g of a 60 percent solution of a coconut alkyd resin in xylene, 23 g of a 65 percent solution of a melamine gum-lac in butanol, 17 g of xylene and 1.5 g of butanol, is added 1 g of the pigment produced according to example 13 and 5 g of titanium dioxide. The mixture is ground for 48 hours in a ball mill and the thus pigmented lacquer is sprayed on to a cleaned metal surface. After stoving at 120°, a yellow dyeing is obtained having a good fastness to light, cross-lacquering and to weather.

EXAMPLE 35

67 g of polyvinyl chloride powder (suspension polymerisate), 33 g of dioctylphthalate, 2 g of dibutyl tin dilaurate, 0.3 g of a stabilizer based on phosphate and 0.7 g of the pigment, produced according to example 1 by condensation of 1-amino-anthraquinone and 2-hydroxy-5-tetrachlorophthalimide-1-benzoic acid, are mixed together and treated for 15 minutes on the mixing rollers which are heated to 160°. A sheet with a thickness of 0.4 mm is subsequently produced on a calendering machine. It is dyed in a pure greenish-yellow shade, whereby the dyeing is resistant to heat and is fast to migration.

We claim:

1. A pigment of the formula

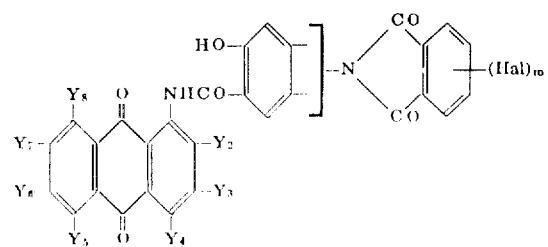

wherein
Hal is chlorine or bromine,
$m$ is an integer of 0 to 4, and
the substituents $Y_2$ to $Y_8$ represent hydrogen, chlorine, bromine, methyl, or methoxy with the proviso that 3 to 7 of the Y substituents represent hydrogen, 0 to 2 of the Y substituents represent methyl, methoxy or bromine, and with the further proviso that 0 to 1 of the substituents $Y_4$, $Y_5$ and $Y_8$ further represents $NH_2$, benzoylamino, chlorobenzoylamino or the radical

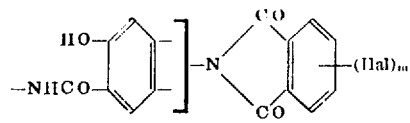

2. A pigment as defined in claim 1, which is of the formula

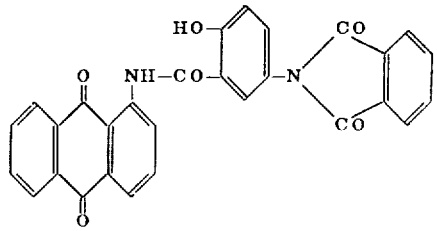

3. A pigment as defined in claim 1, which is of the formula

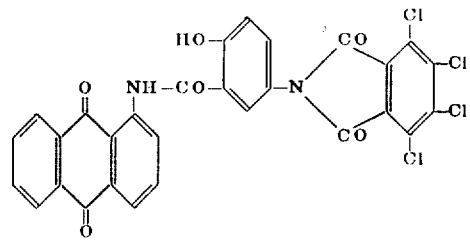

4. A pigment as defined in claim 1, which is of the formula

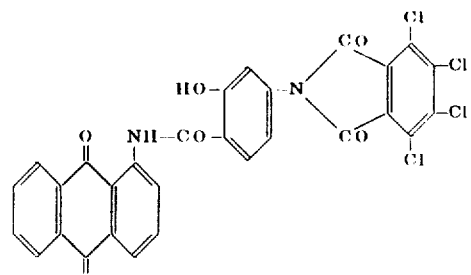

5. A pigment as defined in claim 1, which is of the formula

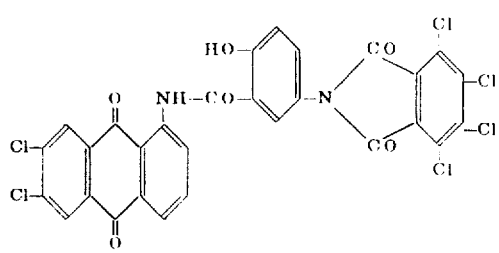

6. A pigment as defined in claim 1, which is of the formula

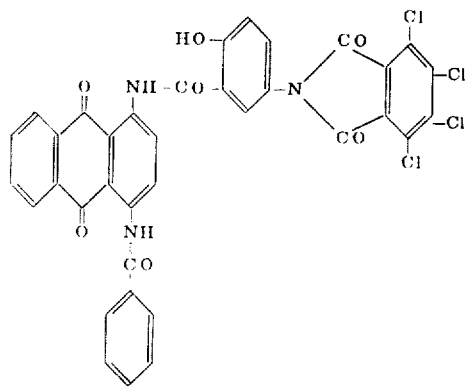

7. A pigment as defined in claim 1 wherein one of $Y_4$, $Y_5$ and $Y_8$ represents benzoylamino, chlorobenzoylamino, the radical

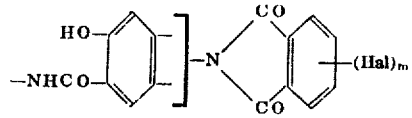

or hydrogen and the second and third thereof represent hydrogen, and each of $Y_2$, $Y_3$, $Y_6$ and $Y_7$ is hydrogen or chlorine.

8. A pigment as defined in claim 1 wherein
$Y_2$, $Y_3$ and $Y_8$ represent hydrogen,
one of $Y_4$ and $Y_5$ represents benzoylamino or chlorobenzoylamino and the other represents hydrogen, and each of $Y_6$ and $Y_7$ represent hydrogen or chlorine.

* * * * *